United States Patent
Jang (10) Patent No.: US 11,397,840 B1
(45) Date of Patent: Jul. 26, 2022

(54) EDGE PLACEMENT ERRORS FOR OPTICAL LITHOGRAPHY

(71) Applicant: Synopsys, Inc., Mountain View, CA (US)

(72) Inventor: Chiou-Hung Stephen Jang, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 358 days.

(21) Appl. No.: 16/353,888

(22) Filed: Mar. 14, 2019

Related U.S. Application Data (60) Provisional application No. 62/642,648, filed on Mar. 14, 2018.

(51) Int. Cl.
| | |
|---|---|
| G06F 30/30 | (2020.01) |
| G03F 1/00 | (2012.01) |
| G03F 7/20 | (2006.01) |
| G06F 30/3323 | (2020.01) |
| G03F 1/36 | (2012.01) |
| G06F 30/398 | (2020.01) |
| G03F 1/70 | (2012.01) |
| G06F 119/18 | (2020.01) |

(52) U.S. Cl.
CPC ............ *G06F 30/3323* (2020.01); *G03F 1/36* (2013.01); *G03F 1/70* (2013.01); *G03F 7/70441* (2013.01); *G06F 30/398* (2020.01); *G06F 2119/18* (2020.01)

(58) Field of Classification Search
None
See application file for complete search history.

(56) References Cited

U.S. PATENT DOCUMENTS

| | | | |
|---|---|---|---|
| 7,030,997 | B2 | 4/2006 | Neurether et al. |
| 7,568,179 | B1 * | 7/2009 | Kroyan ............... G03F 1/36 716/51 |

(Continued)

OTHER PUBLICATIONS

Y. Chen et al., "A Feasible Model-Based OPC Algorithm Using Jacobian Matrix of Intensity Distribution Functions," Proc. of SPIE 6520, Optical Microlithography XX, Mar. 27, 2007, 11 pages. (Year: 2007).*

(Continued)

*Primary Examiner* — Leigh M Garbowski
(74) *Attorney, Agent, or Firm* — Weaver Austin Villeneuve & Sampson LLP (57) ABSTRACT

A method of determining the position of a first edge of a pattern in a mask used in fabricating an integrated circuit in which the first edge corresponds to a second edge associated with the pattern of a layout of the integrated circuit, includes, in part, dividing the edge into a multitude of segments, assigning a variable to each segment, applying a non-linear optimization algorithm to a current location of the first edge to determine an updated position of the first edge, determining a difference between the position of the second edge and a third edge corresponding to the updated position of the first edge and obtained by computer simulation of the mask pattern providing a model of the layout pattern when formed on a semiconductor wafer, and repeating the applying and the determining steps iteratively until the difference is smaller than a threshold value.

10 Claims, 6 Drawing Sheets

(56) References Cited

U.S. PATENT DOCUMENTS

| | | | |
|---|---|---|---|
| 8,122,389 B2* | 2/2012 | Sezginer | G03F 1/36 716/51 |
| 8,239,786 B2* | 8/2012 | Wong | G03F 1/36 716/51 |
| 8,473,878 B2 | 5/2013 | Chow et al. | |
| 8,898,599 B2* | 11/2014 | Liu | G03F 7/70483 716/54 |
| 9,269,144 B2 | 2/2016 | Kraus et al. | |
| 9,858,659 B2* | 1/2018 | Minakawa | G06T 7/001 |
| 10,146,124 B2* | 12/2018 | Li | G06F 30/398 |
| 10,254,641 B2* | 4/2019 | Mailfert | G06F 30/367 |
| 10,488,763 B2* | 11/2019 | Tyminski | G06T 7/73 |
| 2011/0209107 A1 | 8/2011 | Kodera et al. | |
| 2011/0222739 A1 | 9/2011 | Zhou et al. | |
| 2017/0242333 A1 | 8/2017 | Li et al. | |

OTHER PUBLICATIONS

Y.P. Tang et al., "OPC Segmentation: Dilemma between Degree-of-Freedom and Stability with Some Relieves," Proc. of SPIE 7274, Optical Microlithography XXII, Mar. 16, 2009, 11 pages. (Year: 2009).*

Y. Ping et al., Tolerance-based OPC and solution to MRC-constrained OPC< Proc. of SPIE 7973, Optical Microlithography XXIV, Mar. 22, 2011, 9 pages. (Year: 2011).*

S. Jang et al., "Addressing Optical Proximity Correction Challenges from Highly Nonlinear Models," Proc. of SPIE 101471S, Optical Microlithography XXX, Mar. 24, 2017, 9 pages. (Year: 2017).*

Awad et al., "A Lithographic Mast Manufacturability and Pattern Fidelity Aware OPC Algorithm," Publisher: IEEE, Published in: 2016 International Symposium on VLSI Design, Automation and Test (VLSI-DAT), DOI: 10.1109/VLSI-DAT.2016.7482576, (2016).

Li, et al., "Efficient source and mask optimization with augmented Lagrangian methods in Optical Lithography," Optics Express, vol. 21, No. 7, (Apr. 8, 2013).

Jia, et al., "Machine learning for inverse lithography: using stochastic gradient descent for robust photomask synthesis," Journal of Optics, 12, 045601, (9pp), (2010).

* cited by examiner

PRIOR ART

Figure 3A

PRIOR ART

Figure 3B

PRIOR ART

Figure 4A

PRIOR ART

EDGE PLACEMENT ERRORS FOR OPTICAL LITHOGRAPHY

CROSS-REFERENCE TO RELATED APPLICATION

The present application claims benefit to U.S. Patent Application No. 62/642,648, filed Mar. 14, 2018, the content of which is incorporated herein by reference in its entirety.

COPYRIGHT NOTICE

The assignee of this patent document has no objection to the facsimile reproduction by anyone of the patent document itself or of the patent application, as it appears in the files of the United States Patent and Trademark Office, but otherwise reserves all rights whatsoever in any included works of authorship protected by copyright.

SPECIFICATION—DISCLAIMER

*In the following Background, Summary, and Detailed Description, headings should not be construed as necessarily limiting. In the following Background, Summary and Detailed Description, the citation or identification of any publication does not signify relevance or status as prior art for any of the claimed or described embodiments. Paragraphs for which the text is all italicized signifies text that is common to multiple Synopsys patent specifications.*

BACKGROUND

Lithography processing is a key part of the manufacturing of integrated circuits, Micro-Electro-Mechanical Systems (MEMS) and Nano-Electro-Mechanical Systems (NEMS). Lithographic techniques are used to define patterns, geometries, features, shapes, and the like, on a semiconductor wafer. These patterns are typically defined by a set of contours, lines, boundaries, edges, curves, and the like, which generally surround, enclose, and/or define the boundary of the various regions forming the patterns.

The rising demand for higher density of features and patterns on a die or semiconductor wafer has seen a parallel increase in the amount of computations necessary to determine the corresponding mask patterns. Furthermore, as the geometry dimensions approach sizes comparable to the wavelength of the light used in the photolithography processes, the resulting wafer patterns deviate from the corresponding photomask patterns due to undesirable distortions and artifacts. Existing techniques, such as Optical Proximity Correction (OPC) are used to pre-distort the mask patterns to improve resolution and/or a process window in a photolithography process. While such techniques help to print wafer patterns more accurately, determining the pre-distorted mask patterns is increasingly difficult, thereby exacerbating the computational complexity and the associated problems.

Additionally, integrated-circuit designers typically tape out a final design of an integrated circuit for manufacture as one or more target patterns in a file format that includes polygons (which represent boundaries in the integrated circuit), such as those associated with a Graphic Design System (GDS) format. However, the integrated-circuit designers usually only consider logic requirements and electrical characteristics when generating the target patterns. As a consequence, the polygons in the target patterns may not be lithographically optimal and may result in large variations in the wafer patterns formed during the photolithography process.

With optical lithography advancing beyond such nodes, as 7 nm and 5 nm, the challenges encountered in lithography process modeling to better simulate the process behaviors such as negative tone development (NTD) effects, 3D mask effects, and the like, has increased.

Conventional OPC and inverse-lithography technology (ILT) models employed in advanced optical lithography suffer from numerical complexity, convergence and computational efficiency. A need continues to exist for a technique that facilitates the placement of edges while overcoming the above shortcomings of conventional models.

SUMMARY

*The claims signify a brief description of one or more of the innovations, embodiments, and/or examples found within this disclosure.*

In accordance with one embodiment of the present invention, a method is provided to determine the position of a first edge of a pattern in a mask used in fabricating an integrated circuit. The first edge corresponds to a second edge associated with the pattern of a layout of the integrated circuit. The method includes, in part, dividing the edge into a multitude of segments, assigning a variable to each segment, applying a non-linear optimization algorithm to a current location of the first edge to determine an updated position of the first edge, determining a difference between the position of the second edge and a third edge corresponding to the updated position of the first edge and obtained by computer simulation of the mask pattern providing a model of the layout pattern when formed on a semiconductor wafer, and repeating the applying and the determining steps iteratively until the difference is smaller than a threshold value.

In one embodiment, the algorithm is the BFGS algorithm. In another embodiment, the algorithm is the SD algorithm. In one embodiment, the updated position of the first edge is obtained by using N increments, each increment representative of a distance by which the position of the first edge was updated in an earlier iteration, wherein N is an integer greater than one.

In one embodiment, the N increments are N consecutive increments. In one embodiment, the updated position of the first edge is obtained by computing an average of the N increments. In one embodiment, the updated position of the first edge is obtained by computing a weighted average of the N increments.

In accordance with one embodiment of the present invention, a computer system determines a position of a first edge of a pattern in a mask used in fabricating an integrated circuit. The first edge corresponds to a second edge associated with the pattern of a layout of the integrated circuit. The computer system is configured to divide the edge into a multitude of segments, assign a variable to each segment, apply a non-linear optimization algorithm to a current location of the first edge to determine an updated position of the first edge, determine a difference between the position of the second edge and a third edge corresponding to the updated position of the first edge and obtained by computer simulation of the mask pattern providing a model of the layout pattern when formed on a semiconductor wafer, and repeat the applying and the determining iteratively until the difference is smaller than a threshold value.

In one embodiment, the algorithm is the BFGS algorithm. In another embodiment, the algorithm is the SD algorithm.

In one embodiment, the updated position of the first edge is obtained by using N increments, each increment representative of a distance by which the position of the first edge was updated in an earlier iteration, wherein N is an integer greater than one.

In one embodiment, the N increments are N consecutive increments. In one embodiment, the updated position of the first edge is obtained by computing an average of the N increments. In one embodiment, the updated position of the first edge is obtained by computing a weighted average of the N increments.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

DRAWINGS

The following Detailed Description, Figures, appended Additional Figures and appended Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale, and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

In accordance with one aspect of the present invention, polygon edges or contours of patterns, geometries, features, shapes, and the like, of various elements of a circuit are divided into a multitude of segments. Each such segment is treated as a variable in a non-linear optimization algorithm, such as the Broyden-Fletcher-Goldfarb-Shanno (BFGS) algorithm, to cause the placement of the segment edge to be optimized. In accordance with one aspect of the present invention, the values of the variable associated with each segment obtained during previous iterations of the optimization process, are used to determine the step size of the variable during subsequent iterations. A cost function is used to determine if the variable has reached an acceptable value. Once the cost function reaches a threshold value, the optimization process for the variable is terminated. The optimization process then proceeds with the next segment.

Embodiments of the present invention may leverage applicable inverse-lithography technology (ILT) and optical proximity correction (OPC) models to provide enhanced quality of results (QoR) and significantly reduced runtime than ILT's, while maintaining the same mask complexity as is present in current OPC techniques.

Figure 1:
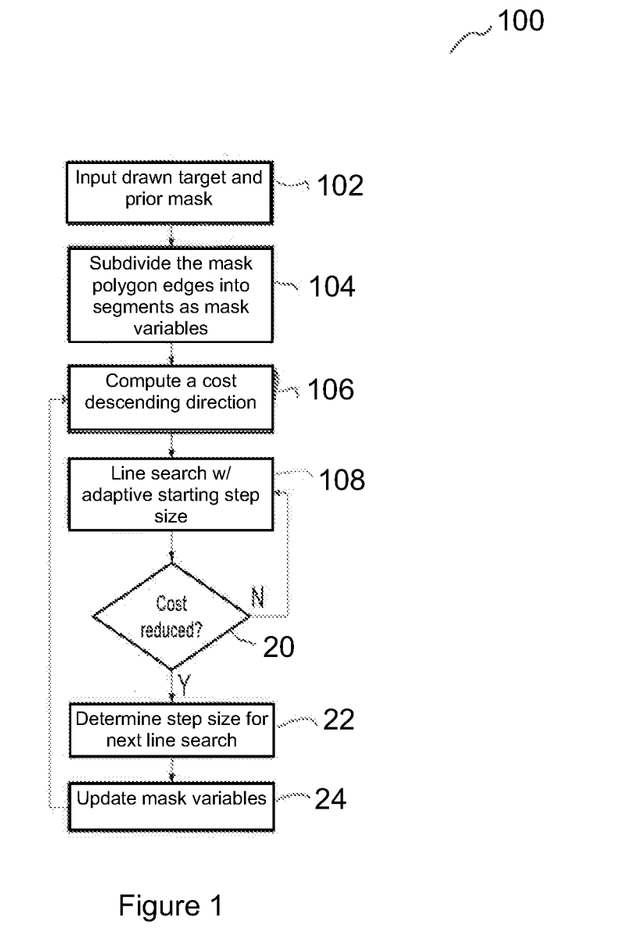
FIG. 1 is an exemplary flowchart for reducing the error in placing edges of a pattern in optical lithography, in accordance with one exemplary embodiment of the present invention.
Figure 2A:
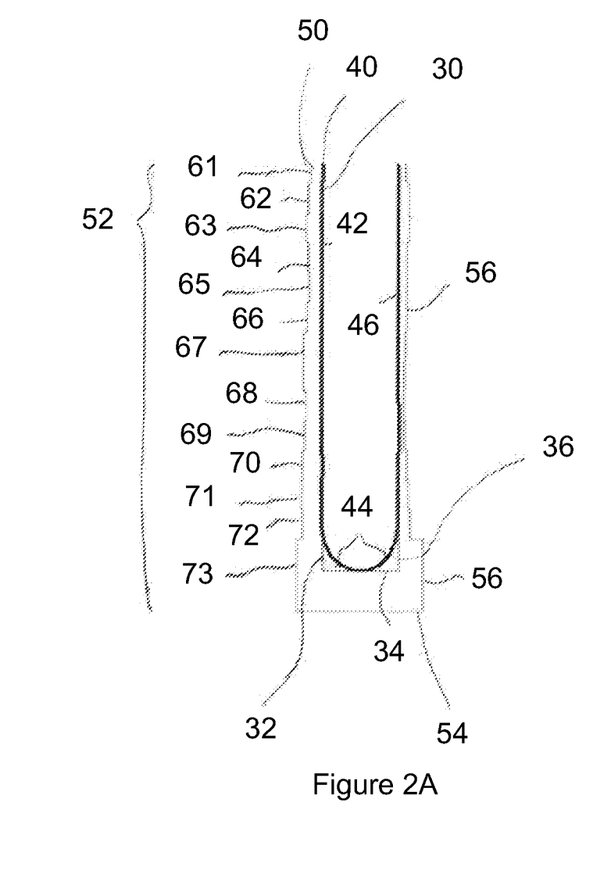
FIGS. 2A and 2B show drawn layout patterns, as well as corresponding simulated mask patterns and printed mask patterns, in accordance with one exemplary embodiment of the present invention.
Figure 2B:
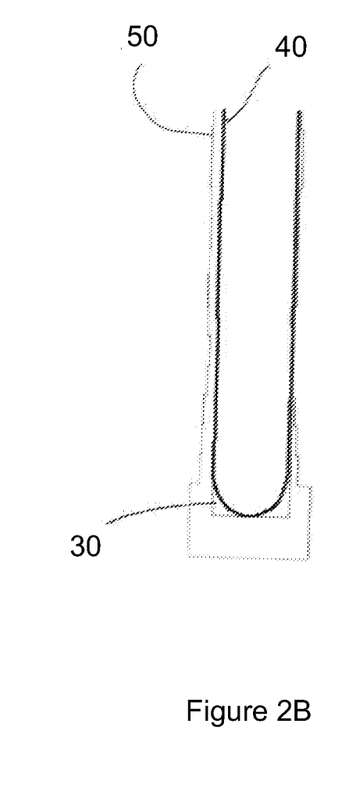

The following description of the embodiments of the present invention is provided with concurrent references to FIGS. 1 and 2. FIG. 1 is an exemplary flowchart 100 for reducing the error in placing the polygon edges (or contours) of a pattern in optical lithography. FIG. 2 shows exemplary drawn pattern as well as the pattern's corresponding simulated mask and printed mask as used in an integrated circuit.

Referring to flowchart 100, at 102, the drawn edge (or contour, both of which are collectively referred to herein as edge) and a corresponding simulated mask edge of the pattern are applied as input variables to the algorithm. Referring to 2A, rectangular pattern 30 is shown as including edges 32, 34 and 36 that are drawn edges in a layout that is subsequently converted to a GDS-type file. Corresponding simulated mask pattern 40 is shown as including edges (which may be straight or curved) 42, 44 and 46. In other words, the drawn rectangular pattern 30 is assumed to result in pattern 40 after it is processed following one or more lithography, etching and other fabrication processes, as is known by those skilled in the art. FIG. 2A also shows pattern 50 assumed to be the actual printed mask pattern corresponding to drawn layout pattern 30. Mask pattern 50 is shown as including, in part, edges 52, 54 and 56 respectively corresponding to simulated mask pattern edges 42, 44 and 46. Edge 52, in turn, is shown as including a multitude of edge segments, namely segments 61, 62, 63, 64, 65, 66, 67, 68, 69, 70, 71, 72, 73. Edge 56 also includes a multitude of edge segments that are not individually identified for purposes of clarity.

Referring to FIG. 1, at 104, polygon (or pattern) edges are divided into multiple segments each being represented by a variable in the optimization process shown in flowchart 100. Any one of a number of criterion may be used to determine how to perform the edge segmentation. For example, the length of an edge and its proximity to other patterns may be used to determine whether to divide the edge, and if so, into how many segments. Referring to FIG. 2A, it is seen that edge 52 is divided into 13 segments, 61, 62, 63 . . . 72, 73. Edge 56 also includes a multitude of segments that are not shown as being individually identified for purposes of clarity, as described above.

Referring to FIG. 1, at 106, the variables representing the various segments are applied to an iterative algorithm, such as the Broyden-Fletcher-Goldfarb-Shanno (BFGS) algorithm or the steepest descent (SD) algorithm to compute a cost-descending direction of travel of the edge. The position of each segment is determined in an iterative process such that the error between that segment's corresponding simulated mask pattern edge and the corresponding drawn layout edge of the pattern falls below a threshold value. Referring to FIG. 2A, for example, the drawn edge 32 and the simulated mask pattern edge 42 are associated with and thus corresponding with segments 61-63 of printed mask edge 52. Therefore, the optimum position of each such segment is determined when the error, also referred to as the cost function, between the simulated mask pattern edge 42 and the drawn pattern edge 32 falls below a threshold value.

The initial position of each segment is estimated. Thereafter, the algorithm is applied in an iterative matter to determine the direction toward which the segment should move to achieve placement optimization. Referring to FIG. 1, knowing the cost-descending direction of travel obtained at 106, the distance by which the segment should be moved is determined by the algorithm at 108. In one embodiment, this distance is determined using a line search that takes into account the distances obtained during the previous N iterations of the variable. For example, for segment 72 shown in FIG. 2A, the distance during a tenth iteration of the optimization algorithm may be determined by taking the average of the distances obtained during the immediately preceding, for example, 6 iterations. In other embodiments, the distance during iteration, e.g., K of the optimization algorithm of a variable, may be determined by taking a weighted average of the distances obtained during the immediately preceding, e.g., L iterations of the variable where K and L are integers.

As described above, after the optimization direction is determined at 106, a step size is determined for the variable to start the optimization process. As was also described above, embodiments of the present invention use the previous values of the step size to determine its current and future values. In conventional algorithms, such as the ILT, finding the step size is slow for two reasons. First, the optimization direction as determined by the steepest decent (SD) technique used in the ILT algorithm is often inadequate and leads to numerous iterations in determining the appropriate step size. Moreover, since the initial value of the step size is constant, the number of iterations required in determining the appropriate step size is often relatively high. Embodiments of the present invention overcome both these shortcomings by benefiting from the relatively more accurate direction provided by the BFGS algorithm, as well as the history-based learning method used to determine the step or increment size, thus leading to significant improvement in the optimization speed.

At 20, a determination is made as to whether the position of the segment as obtained during the last iteration reduces a cost function to a predefined value. Such a cost function may be defined by a criteria defined by a difference between the corresponding simulated mask edges and drawn layout edges corresponding to that segment. For example, when the difference between a simulated mask edge and the edge's corresponding drawn layout edge associated with a segment falls below a threshold value, the cost functions is considered to have reached a predefined value at which point the position of the segment as determined during the last iteration is considered optimum. If at 20, the cost function is not considered to have been reduced to the predefined value, the optimization process moves to 108 at which point a new iteration for that segment is performed and a new cost function is computed. If the cost function at 20 is considered to have reached the predefined value, a new edge segment is selected at 22. Next, at 24 the mask values are updated, subsequent to which the process moves to 106 to start the optimization cycle for the next edge segment selected at 22. Drawn pattern 32 shown in FIG. 2A is assumed to be in the vicinity of another drawn pattern not shown in FIG. 2B. FIG. 2B shows the same drawn pattern 32 except that in FIG. 2B, pattern 32 is assumed to be relatively farther away from other patterns. As a result, in FIG. 2B, mask pattern 50 is shown as resulting in a relatively smaller cost and hence closer to both the simulated mask pattern 40 as well as the drawn mask pattern 30.

Figure 3A:
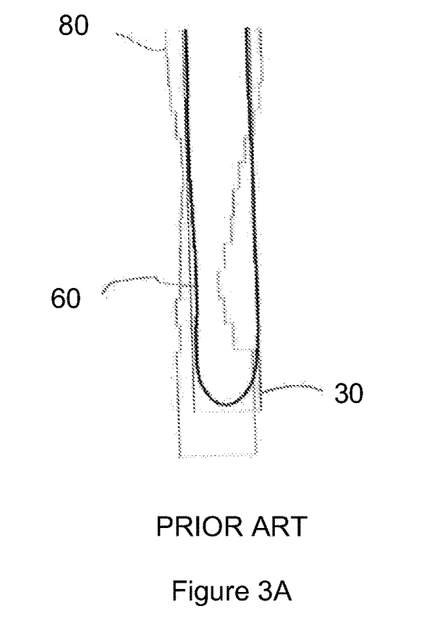
FIGS. 3A and 3B show drawn layout patterns, as well as corresponding simulated mask patterns and printed mask patterns, as known in the prior art.
Figure 3B:
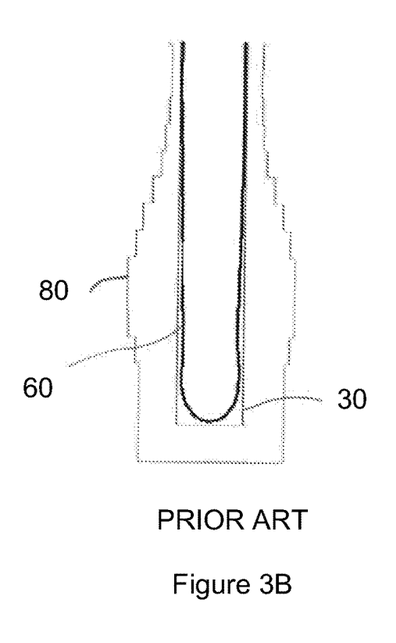

FIG. 3A shows the same drawn pattern 30 as in FIG. 2A except that in FIG. 3A, a conventional OPC algorithm is used to obtain the mask pattern 80. Also shown in FIG. 3A is the simulated mask pattern 60. As is seen in FIG. 3A, the conventional OPC algorithm does not converge to acceptable values for the edge segments. FIG. 3B shows the same drawn pattern 30 as in FIG. 3A except that in FIG. 3B, the OPC algorithm is used to obtain mask pattern 80. Also shown in FIG. 3B is the simulated mask pattern 60. As is seen in FIG. 3B, conventional OPC algorithms may fail to provide acceptable positions for the edges.

Figure 4A:
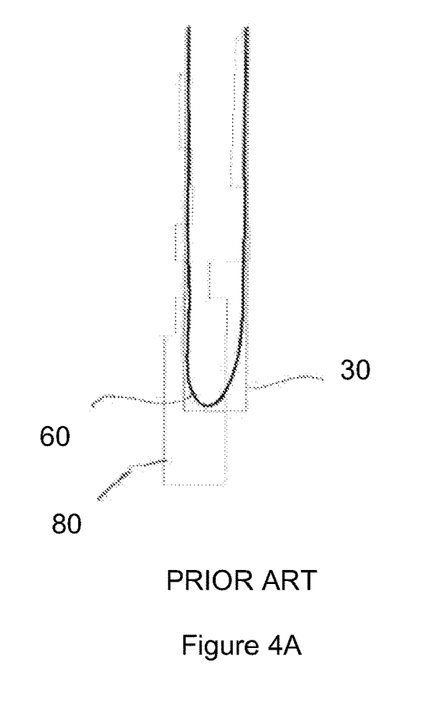
FIGS. 4A and 4B show drawn layout patterns, as well as corresponding simulated mask patterns and printed mask patterns, as known in the prior art.
Figure 4B:
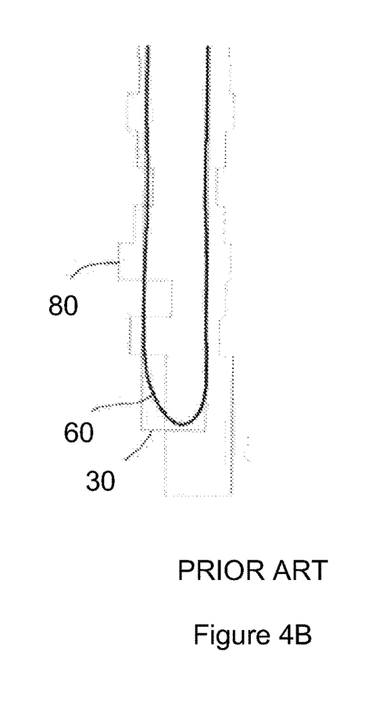

FIGS. 4A and 4B show the same drawn pattern 30 as in FIGS. 2A and 2B respectively, except that in FIGS. 4A and 4B, another conventional OPC algorithm is used to obtain mask patterns 80. Also shown in FIGS. 4A and 4B are the simulated mask pattern 60. As is seen in FIGS. 4A and 4B, conventional OPC algorithms may fail to provide acceptable positions for the edges.

Figure 5:
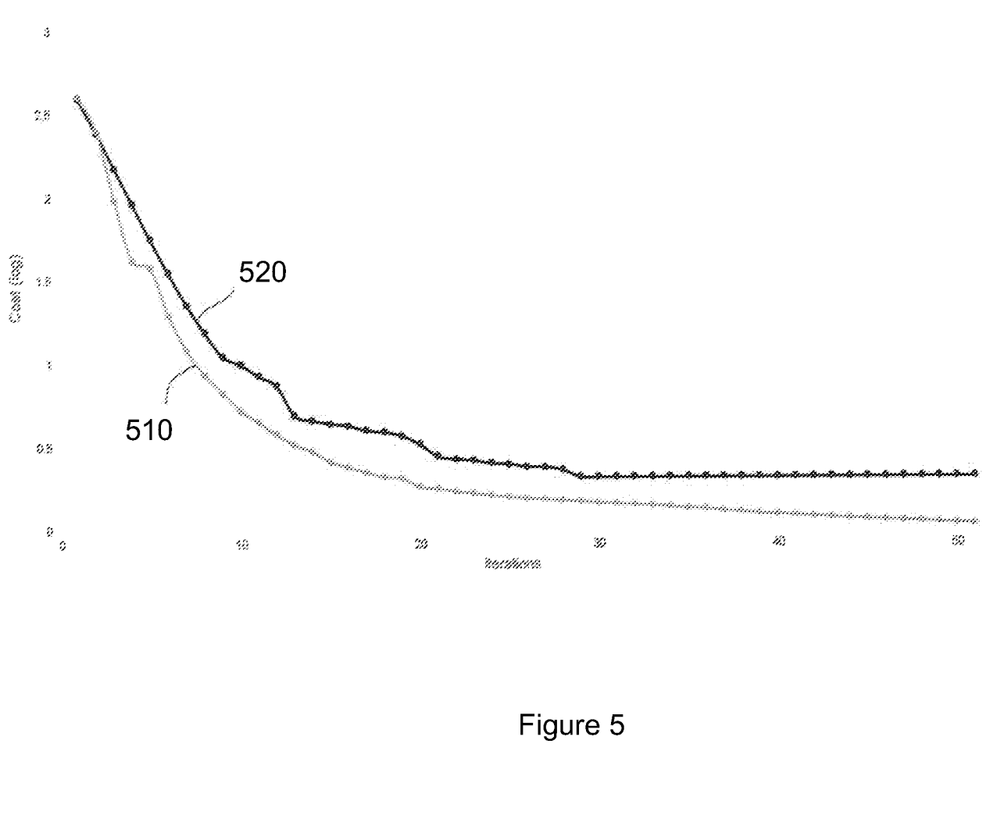
FIG. 5 shows in part the cost as a function of the number of iterations for optimizing an exemplary edge position of a pattern, in accordance one embodiment of the present invention.

Plot 510 of FIG. 5 shows the Logarithm of the cost as a function of the number of iterations for optimizing the placement of an edge of an exemplary pattern in an optical lithography process, in accordance one embodiment of the present invention. Plot 520 shows the Logarithm of cost as a function of the number of iterations to optimize the placement of the same edge as in plot 510 using a conventional ILT technique. As is seen by comparing these two plots, at each iteration value, the cost is significantly lower in plot 510 compared to plot 520.

Technology Support General Computer Explanation

Figure 6A:
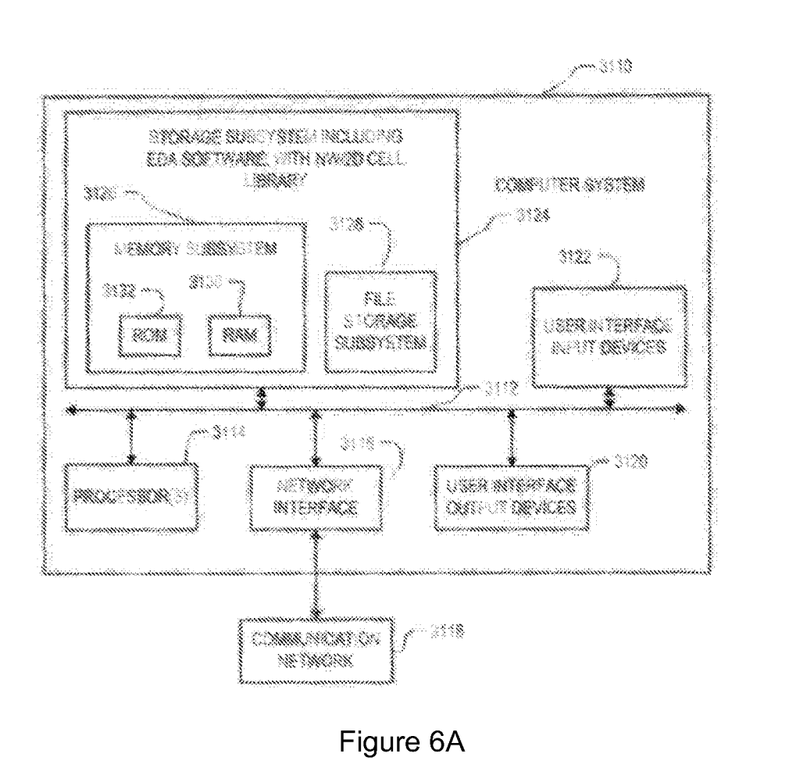
FIGS. 6A, 6B and 6C are simplified block diagrams of a computer system suitable for use with embodiments of the technology, as well as circuit design and circuit embodiments of the technology.
Figure 6B:
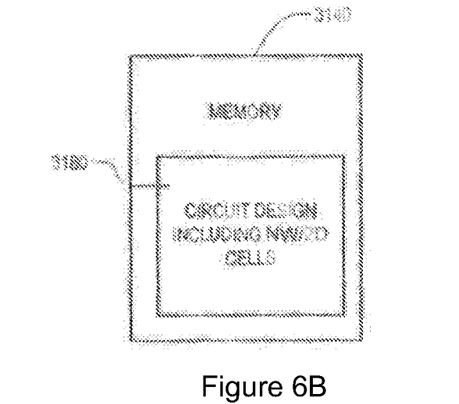
Figure 6C:
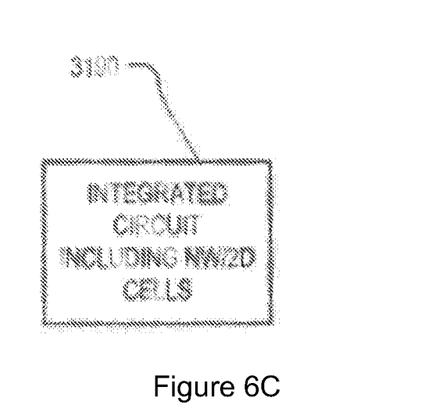

FIGS. 6A, 6B and 6C are simplified block diagrams of a computer system suitable for use with embodiments of the technology, as well as circuit design and circuit embodiments of the technology.

In FIG. 6A, computer system 3110 typically includes at least one computer or processor 3114 which communicates with a number of peripheral devices via bus subsystem 3112. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted "blade", a kiosk, a television, a game station, a network router, switch or bridge, or any data processing machine capable of executing instructions (sequential or otherwise) that specify actions to be taken by that machine.

The computer system typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi processor or multi-core system and may use or be implemented in a distributed or remote system. The term 'processor' here is used in the broadest sense to include a singular processor and multi-core or multi processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 3110 depicted in FIG. 6A is intended only as one example for purposes of illustrating the preferred embodiments. Many other configurations of computer system 3110 are possible having more or less components than the computer system depicted in FIG. 6A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 3122 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 3110 or onto communication network 3118. User interface input devices typically allow a user to select objects, icons, text and the like that appear on some types of user interface output devices, for example, a display subsystem.

User interface output devices 3120 may include a display subsystem, a printer, a fax machine, or non-visual displays such as audio output devices. The display subsystem may include a cathode ray tube (CRT), a flat panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 3110 to the user or to another machine or computer system.

Memory subsystem 3126 typically includes a number of memories including a main random-access memory (RAM) 3130 (or other volatile storage device) for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 3128.

Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses. For example, RAM-based main memory can communicate directly with file storage systems using Direct Memory Access (DMA) systems.

FIG. 6B depicts a memory 3140 such as a non-transitory, computer readable data and information storage medium associated with file storage subsystem 3128, and/or with network interface subsystem 3116, and can include a data structure specifying a circuit design. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 6C signifies an integrated circuit 3190 created with the described technology that includes one or more cells selected, for example, from a cell library.

Technology Support Hardware/Software Equivalence

Some of the innovations, embodiments and/or examples described herein comprise and/or use a processor. As used herein, the term 'processor' signifies a tangible data and information processing device that physically transforms data and information, typically using a sequence transformations (also referred to as 'operations'). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi processor arrays, including graphic processing units, digital signal processors, digital processors or combinations of these elements.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For data and information structured in binary form, any processor that can transform the data and information using the AND, OR and NOT logical operations (and their derivatives, such as the NAND, NOR, and XOR operations) can transform the data and information using any function of Boolean logic. A processor such as an analog neural network processor can also transform data and information non-digitally. There is no scientific evidence that any of these processors are processing, storing and retrieving data and information, in any manner or form equivalent to the bioelectric structure of the human brain.

The one or more processors may also operate to support performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API).)

As used herein, the term 'module' signifies a tangible data and information processing device, that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Intel's Altera), Random Access Memories (RAMS) or microprocessors. A module is configured to process data and information, typically using a sequence transformations (also referred to as 'operations') applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term 'algorithm' signifies a process comprising a sequence or set of operations or instructions that a module can use to transform data and information to achieve a result. A module can comprise one or more algorithms. As used herein, the term 'thread' refers to a sequence of instructions that can comprise a subset of the instructions of an entire process or algorithm. A process or algorithm can be partitioned into multiple threads that can be executed in parallel.

As used herein, the term 'computer' includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term 'software' or 'program' signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term 'programming language' signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software or has an interface device that receives the software over a network. This process is discussed in the General Computer Explanation section.

Technology Support EDA System/Workflow Explanation

Figure 7:
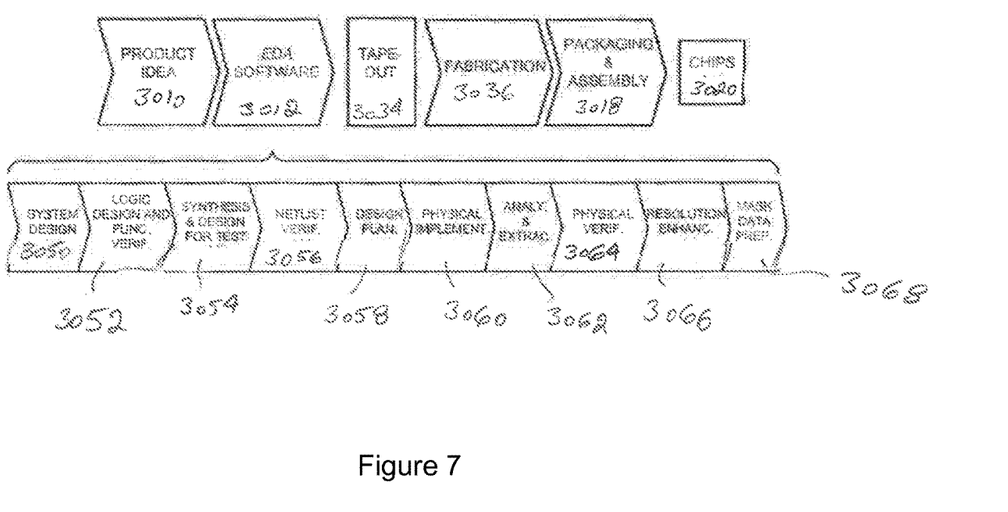
FIG. 7 illustrates various processes performed in the design, verification and fabrication of an integrated circuit design.

FIG. 7 illustrates various processes performed in the design, verification and fabrication of an item of manufacture such as an integrated circuit using software tools with a computer, and possibly special hardware-assisted tools, to transform and verify design data and instructions that represent the integrated circuit. These processes start with the generation of a product idea 3010 with information supplied by a designer, information which is transformed during a process to create an item of manufacture (referred to herein as a design or device) that uses an EDA software tool 3012, which may also be signified herein as EDA software, as a design tool, or a verification tool. When the design is finalized, it can be taped-out 3034, which typically is when artwork (e.g., geometric patterns) for the integrated circuit is sent to a fabrication facility to manufacture the mask set, which is then used to manufacture the integrated circuit. After tape-out, a semiconductor die is fabricated 3036 and packaging and assembly processes 3018 are performed, which result in the finished integrated circuit 3020 which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses an EDA software tool 3012 includes processes 3050-3068, which are described below. This design flow description is for illustration purposes only and is not meant to limit the present disclosure. For example, an actual integrated circuit design may require a designer to perform the design operations in a different sequence than the sequence described herein.

During system design 3050, a designer describes the functionality to be manufactured. The designer can also perform what-if planning to refine the functionality and to check costs, etc. Hardware-software architecture partitioning can occur at this stage. Exemplary EDA software products from Synopsys, Inc. of Mountain View, Calif., that can be used at this stage include: Model Architect, Saber, System Studio, and Designware products.

During logic design and functional verification 3052, modules in the circuit are specified in one or more hardware description languages, or HDLs, and the design in HDL is checked for functional accuracy, that is, to match the requirements of the specification of the circuit or system being designed to ensure that the design produces the correct outputs. Exemplary HDL languages are Verilog, VHDL and SystemC. Functional verification is typically done by using software-based simulators and other tools such as testbench generators, static HDL checking tools and formal verification tools. In some situations, special hardware referred to as 'emulators' or 'prototyping systems' are used to speed up the functional verification. Exemplary EDA software products from Synopsys, Inc. of Mountain View, Calif. that can be used at this stage include: VCS, Vera, Designware, Magellan, Formality, ESP and Leda products. Exemplary emulator and prototyping products also available from Synopsys that can be used at this state include: Zebu® and Protolink® (®="Registered Trademark").

During synthesis and design for test 3054, HDL code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification 3056, the netlist is checked for compliance with timing constraints and for correspondence with the HDL code. Exemplary EDA software products from Synopsys, Inc. of Mountain View, Calif. that can be used at this stage include: Formality, Primetime, and VCS products.

During design planning 3058, an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation 3060, the physical placement (positioning of circuit elements such as transistors or capacitors) and routing (connection of the same by a plurality of conductors) occurs, as can selection of library cells to perform specific logic functions. Exemplary EDA software products from Synopsys, Inc. of Mountain View, Calif. that can be used at this stage include: the Astro and IC Compiler products.

During analysis and extraction 3062, the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification 3064, the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement 3066—geometric manipulations of the layout are performed to improve manufacturability of the design. Exemplary EDA software products from Synopsys, Inc. of Mountain View, Calif. that can be used at this stage include: Proteus products.

During tape-out, data is created to be used (after lithographic enhancements are applied if appropriate) for production of lithography masks. Example EDA software products from Synopsys, Inc., that can be used during tape-out include the IC Compiler and Custom Designer families of products.

During mask-data preparation 3068—the 'tape-out' data is used to produce lithography masks that are used to produce finished integrated circuits. Exemplary EDA software products from Synopsys, Inc. of Mountain View, Calif. that can be used at this stage include the CATS family of products.

For all of the above mentioned integrated circuit design tools, similar tools from other EDA vendors, such as Cadence, Siemens, other corporate entities or various non-commercial tools from universities, or open source repositories, can be used as an alternative.

Embodiments of the present disclosure can be used during one or more of the above-described stages. Specifically, some embodiments of the present disclosure can be used in EDA software 3012.

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

Semantic Support

The signifier 'commercial solution' signifies, solely for the following paragraph, an engineering domain-specific (and thus non-preemptive—see Bilski) electronic structure, process for specified machines, manufacturable circuit (and their Church-Turing equivalents) or composition of matter that is useful in commerce to solve a problem of technology, that is, a use in commerce of an application of science or use in commerce of technology.

The signifier 'abstract' (when used in a patent claim for any embodiments disclosed herein for a new commercial solution that is a scientific application of one or more laws of nature {see Benson}, and that solves a problem of technology {see Diehr} used in commerce—or improves upon an existing commercial solution {see Diehr})—is precisely defined by the inventor(s) {see MPEP 2111.01} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is "difficult to understand" {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art items that can be combined {see Alice} by a person having ordinary skill in the art {a "PHOSITA", see MPEP 2141-2144} to be equivalent to the new commercial solution, and is thus unpatentable under 35 U.S.C. 103, for example, because it is "difficult to understand" how the new commercial solution differs from a PHOSITA-combination/-application of the existing prior art; or c) a new commercial solution is 'abstract' if it is not disclosed with an enabling description either because there is insufficient guidance in the enabling description, or because only a generic implementation is described {see Mayo} with unspecified elements, parameters or functionality, so that a PHOSITA is unable to instantiate a useful embodiment of the new commercial solution, without, for example, requiring special programming {see Katz} or circuit design to be performed by the PHOSITA), and is thus unpatentable under 35 U.S.C. 112, for example, because it is "difficult to understand" how to use in commerce any embodiment of the new commercial solution.

CONCLUSION

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein are chosen to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

What is claimed is:

1. A method of determining a placement position of a first edge of a mask pattern used in fabricating an integrated circuit, said first edge corresponding to a second edge associated with a layout pattern of the integrated circuit, the method comprising:
   dividing the first edge into a plurality of segments;
   assigning a variable to each segment of the plurality of segments;
   applying, sequentially using each variable assigned to each segment of the plurality of segments, a non-linear optimization algorithm to a current location of the first edge to generate an updated position for the first edge;
   determining a difference between a second position of the second edge and a third position of a third edge corresponding to the updated position of the first edge and obtained by computer simulation of the mask pattern, wherein the computer simulation provides a model of the layout pattern when formed on a semiconductor wafer; and
   repeating the applying and the determining steps iteratively until the difference is smaller than a threshold value, wherein the updated position of the first edge is obtained by using N increments, wherein each increment of the N increments is representative of a distance by which a first position of the first edge was updated in an iteration, and wherein N is an integer greater than one.

2. The method of claim 1, wherein the non-linear optimization algorithm is one of a Broden-Fletcher-Goldfarb-Shanno (BFGS) algorithm or a steepest descent (SD) algorithm.

3. The method of claim 1 wherein the N increments are N consecutive increments.

4. The method of claim 1 wherein the updated position of the first edge is obtained by computing an average of the N increments.

5. The method of claim 1 wherein the updated position of the first edge is obtained by computing a weighted average of the N increments.

6. A computer system configured to determine a placement position of a first edge of a pattern in a mask used in fabricating an integrated circuit, said first edge corresponding to a second edge associated with the pattern of a layout of the integrated circuit, the computer system being further configured to:
   divide the first edge into a plurality of segments;
   assign a variable to each segment of the plurality of segments;
   apply, sequentially using each variable assigned to each segment of the plurality of segments, a non-linear optimization algorithm to a current location of the first edge to generate an updated position for the first edge;
   determine a difference between a second position of the second edge and a third position of a third edge corresponding to the updated position of the first edge and obtained by computer simulation of the mask pattern, said computer simulation providing a model of the layout pattern when formed on a semiconductor wafer; and
   repeat the applying and the determining iteratively until the difference is smaller than a threshold value, wherein the updated position of the first edge is obtained by using N increments, wherein each increment of the N increments is representative of a distance by which a first position of the first edge was updated in an iteration, and wherein N is an integer greater than one.

7. The computer system of claim 6, wherein the non-linear optimization algorithm is one of a Broden-Fletcher-Goldfarb-Shanno (BFGS) algorithm or a steepest descent (SD) algorithm.

8. The computer system of claim 6 wherein the N increments are N consecutive increments.

9. The computer system of claim 6 wherein the updated position of the first edge is obtained by computing an average of the N increments.

10. The computer system of claim 6 wherein the updated position of the first edge is obtained by computing a weighted average of the N increments.

* * * * *